(12) United States Patent
Luo et al.

(10) Patent No.: US 11,079,158 B2
(45) Date of Patent: Aug. 3, 2021

(54) METHOD OF STACKING REFRIGERATED SHIPPING CONTAINERS

(71) Applicant: CARRIER CORPORATION, Palm Beach Gardens, FL (US)

(72) Inventors: Dong Luo, South Windsor, CT (US); Veronica Adetola, West Hartford, CT (US); David W. Gerlach, Ellington, CT (US); Hayden M. Reeve, West Hartford, CT (US); Craig R. Walker, South Glastonbury, CT (US); Lucy Yi Liu, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 96 days.

(21) Appl. No.: 16/338,484

(22) PCT Filed: Oct. 9, 2017

(86) PCT No.: PCT/US2017/055753
§ 371 (c)(1),
(2) Date: Mar. 31, 2019

(87) PCT Pub. No.: WO2018/071331
PCT Pub. Date: Apr. 19, 2018

(65) Prior Publication Data
US 2019/0233211 A1    Aug. 1, 2019

Related U.S. Application Data

(60) Provisional application No. 62/406,194, filed on Oct. 10, 2016.

(51) Int. Cl.
*F25D 11/00* (2006.01)
*B65D 88/74* (2006.01)
(Continued)

(52) U.S. Cl.
CPC ............ *F25D 11/003* (2013.01); *B65D 88/74* (2013.01); *B65D 88/745* (2013.01); *B65G 1/137* (2013.01);
(Continued)

(58) Field of Classification Search
CPC ...................................... F25D 11/003
See application file for complete search history.

(56) References Cited

U.S. PATENT DOCUMENTS 4,802,342 A * 2/1989 Gustafson ............ B60H 1/3232
62/239
5,613,826 A * 3/1997 Scott ....................... G06Q 10/08
414/802
(Continued)

FOREIGN PATENT DOCUMENTS

CN         104603030 A    5/2015
CN         205149501 U    4/2016
(Continued)

OTHER PUBLICATIONS

Dekker, Rommert, et al., "Advanced methods for container stacking"; Economic Institute, Erasmus University Rotterdam; Spring 2006; 24 pgs.
(Continued)

*Primary Examiner* — Thomas Randazzo
(74) *Attorney, Agent, or Firm* — Cantor Colburn LLP

(57) ABSTRACT

Method of stacking refrigerated shipping containers (10) including categorizing a plurality of refrigerated shipping containers (10) as a low temperature container (L) or a high temperature container (H), each of the refrigerated shipping containers (10) having a condenser (16). The method also includes disposing the plurality of refrigerated shipping
(Continued)

containers (10) relative to each other based on the temperature categorization of the refrigerated shipping containers (10).

15 Claims, 5 Drawing Sheets

(51) Int. Cl.
    *F25D 3/06* (2006.01)
    *B65G 1/137* (2006.01)
    *B65G 57/03* (2006.01)
(52) U.S. Cl.
    CPC .............. *B65G 57/03* (2013.01); *F25D 3/06* (2013.01); *B65G 2201/0235* (2013.01); *B65G 2203/045* (2013.01); *F25D 2400/32* (2013.01); *F25D 2500/02* (2013.01)

(56) References Cited

U.S. PATENT DOCUMENTS

| | | | | |
|---|---|---|---|---|
| 5,678,715 | A * | 10/1997 | Sjostedt | B65D 88/121 220/1.5 |
| 6,758,057 | B2 | 7/2004 | Vince, II et al. | |
| 7,351,136 | B2 * | 4/2008 | Nelson | B60H 1/00364 454/118 |
| 2004/0020236 | A1 * | 2/2004 | Vince, II | B60P 3/20 62/434 |
| 2006/0192709 | A1 * | 8/2006 | Schantz | G01V 15/00 342/125 |
| 2007/0175236 | A1 * | 8/2007 | Dryzun | F25D 11/006 62/371 |
| 2010/0021272 | A1 | 1/2010 | Ward et al. | |
| 2011/0221573 | A1 * | 9/2011 | Huat | G05B 15/02 340/10.1 |
| 2012/0318007 | A1 | 12/2012 | Lukasse et al. | |
| 2013/0014521 | A1 | 1/2013 | Lukasse et al. | |
| 2013/0045870 | A1 * | 2/2013 | Rogers | B65D 88/741 505/163 |
| 2013/0104582 | A1 * | 5/2013 | Sandkoetter | F25B 49/022 62/196.3 |
| 2013/0113289 | A1 | 5/2013 | Ma et al. | |
| 2013/0312450 | A1 * | 11/2013 | Iwasa | H02J 50/10 62/440 |
| 2014/0343741 | A1 | 11/2014 | Clarke | |
| 2014/0374501 | A1 | 12/2014 | Sivan | |
| 2015/0241108 | A1 | 8/2015 | Maldonado | |
| 2016/0216028 | A1 * | 7/2016 | Jonsson | F25D 29/003 |
| 2017/0268814 | A1 * | 9/2017 | Sigety | F25D 23/021 |
| 2018/0011132 | A1 * | 1/2018 | Freer | F25D 11/003 |
| 2019/0112514 | A1 * | 4/2019 | Miyashita | C09K 5/066 |

FOREIGN PATENT DOCUMENTS

| | | |
|---|---|---|
| DE | 10233672 A1 | 6/2003 |
| DE | 102007002940 A1 | 7/2008 |
| GB | 2037414 A | 7/1980 |
| JP | H08198383 A | 8/1996 |
| JP | 2003165497 A | 6/2003 |
| KR | 20150116981 A | 10/2015 |
| WO | 2006093744 A2 | 9/2006 |
| WO | 2012022355 A1 | 2/2012 |
| WO | 2013110822 A1 | 8/2013 |
| WO | 2014147076 A1 | 9/2014 |
| WO | 2015174830 A1 | 11/2015 |

OTHER PUBLICATIONS

Germanischer Lloyd Aktiengesellschaft; Guidelines for the Carriage of Refrigerated Containers on Board Ships; 2003 Edition; 14 pgs.
International Search Report and Written Opinion regarding related PCT App. No. PCT/US2017/055753; dated Jan. 18, 2018; 15 pgs.
Chinese Office Action for application No. 201780062697.7; dated Aug. 19, 2020; 8 pages.

* cited by examiner

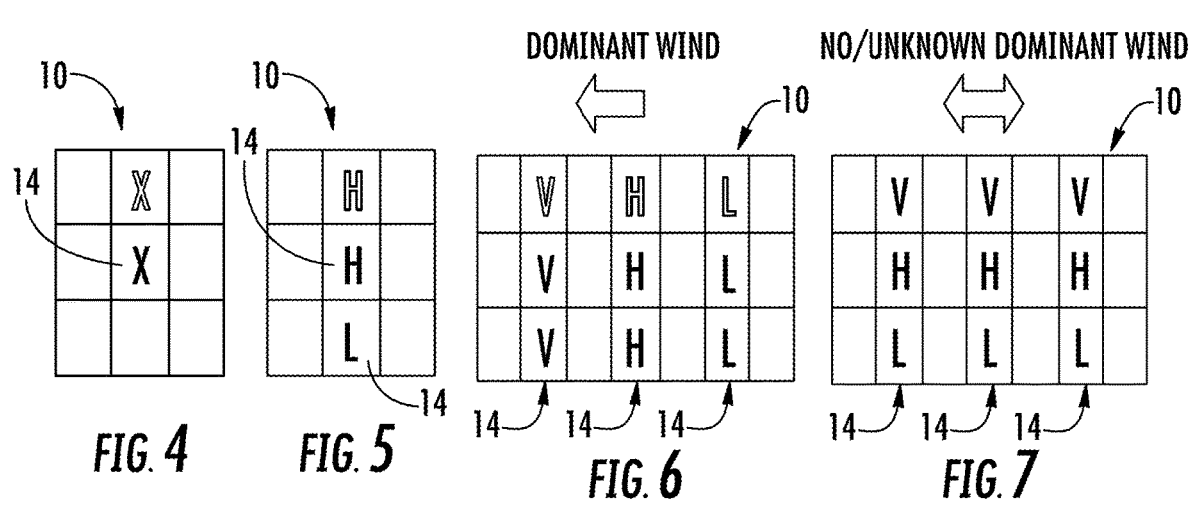

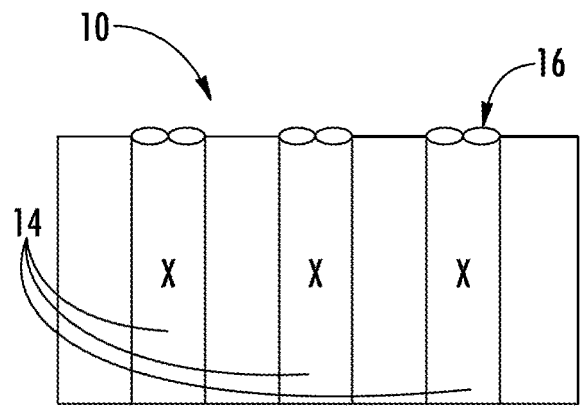
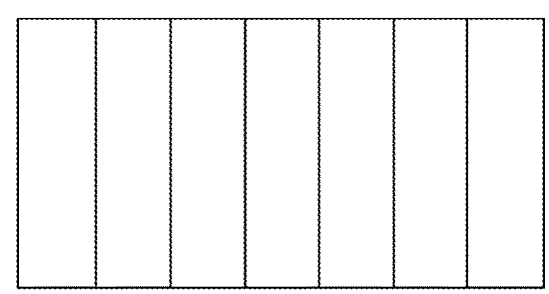
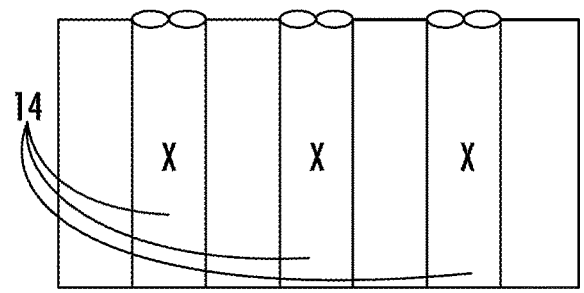
FIG. 8
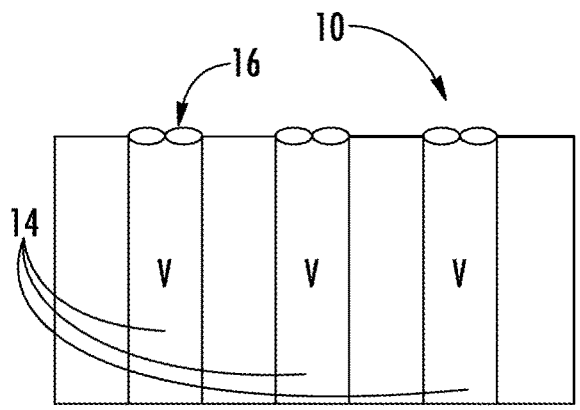
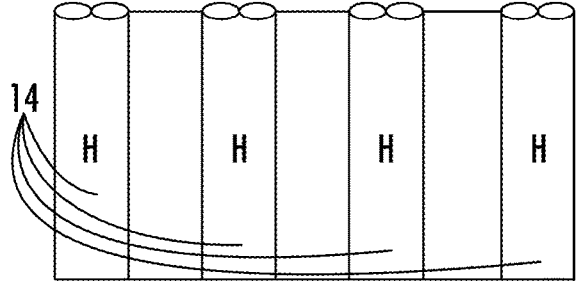
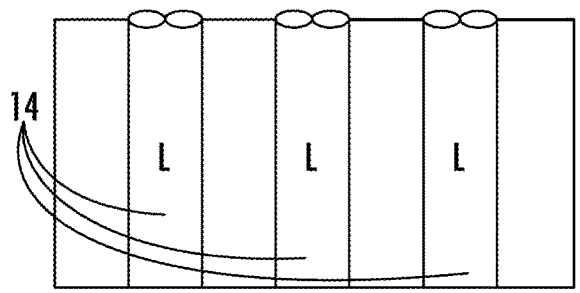
FIG. 9

METHOD OF STACKING REFRIGERATED SHIPPING CONTAINERS

CROSS-REFERENCE TO RELATED APPLICATIONS

This application is based on International Application No. PCT/US2017/055753, filed on Oct. 9, 2017, which claims priority to U.S. Provisional Patent Application Ser. No. 62/406,194, filed Oct. 10, 2016, both of which are incorporated herein by reference in their entireties.

BACKGROUND

Exemplary embodiments pertain to the art of refrigerated shipping containers and, more particularly, to a method of determining a stacked formation of refrigerated shipping containers.

Shipping containers with a refrigeration system included, also referred to as "reefers," typically dissipate heat through a condenser. Air cooled reefers use ambient air to cool condensers and discharge heated air back to the surroundings. When reefers are stacked close to each other, some of the hot exhaust air from one reefer may enter the condensers of reefers located nearby, leading to elevated air temperature entering condensers.

Air entering condensers at elevated temperatures may result in a higher condensing pressure and more power consumption, refrigeration system trip-off with continuous rising air temperature due to recirculation, and degradation of quality of cargo stored inside the reefers due to interrupted operation. It would be desirable to mitigate the amount of heated air entering reefer condensers to avoid the aforementioned unwanted effects.

BRIEF DESCRIPTION

Disclosed is a method of stacking refrigerated shipping containers. The method includes categorizing a plurality of refrigerated shipping containers as a low temperature container or a high temperature container, each of the refrigerated shipping containers having a condenser. The method also includes disposing the plurality of refrigerated shipping containers relative to each other based on the temperature categorization of the refrigerated shipping containers.

In addition to one or more of the features described above, or as an alternative, further embodiments may include determining a dominant wind direction of ambient air surrounding the refrigerated shipping containers.

In addition to one or more of the features described above, or as an alternative, further embodiments may include that the refrigerated shipping containers categorized as high temperature containers are disposed on top of the refrigerated shipping containers categorized as low temperature containers if no dominant wind direction is determined.

In addition to one or more of the features described above, or as an alternative, further embodiments may include that the refrigerated shipping containers categorized as high temperature containers are disposed on top of the refrigerated shipping containers categorized as low temperature containers if no dominant wind direction is known.

In addition to one or more of the features described above, or as an alternative, further embodiments may include disposing at least one refrigerated shipping container that operates under continuous refrigeration on top of the refrigerated shipping containers categorized as high temperature containers if no dominant wind direction is determined or if no dominant wind direction is known.

In addition to one or more of the features described above, or as an alternative, further embodiments may include that the refrigerated shipping containers categorized as high temperature containers are disposed down wind of the refrigerated shipping containers categorized as low temperature containers based on the dominant wind direction determined.

In addition to one or more of the features described above, or as an alternative, further embodiments may include disposing at least one refrigerated shipping container that operates under continuous refrigeration down wind of the refrigerated shipping containers categorized as high temperature containers based on the dominant wind direction determined.

Also disclosed is a method of stacking refrigerated shipping containers. The method includes determining a flow profile of heated air exhausted from a plurality of condensers of a plurality of refrigerated shipping containers. The method also includes disposing the plurality of refrigerated shipping containers relative to each other based on the locations of the plurality of condensers.

In addition to one or more of the features described above, or as an alternative, further embodiments may include that disposing the refrigerated shipping containers comprises avoiding disposing two condensers in adjacent rows.

In addition to one or more of the features described above, or as an alternative, further embodiments may include that disposing the refrigerated shipping containers comprises disposing two condensers in adjacent rows and at different stacked heights.

In addition to one or more of the features described above, or as an alternative, further embodiments may include that disposing the refrigerated shipping containers comprises maximizing the spacing between the condensers in a widthwise direction.

In addition to one or more of the features described above, or as an alternative, further embodiments may include that disposing the refrigerated shipping containers comprises maximizing the spacing between the condensers in a heightwise direction.

In addition to one or more of the features described above, or as an alternative, further embodiments may include disposing the refrigerated shipping containers in end rows of a stacked formation.

In addition to one or more of the features described above, or as an alternative, further embodiments may include that the condensers are facing open air.

In addition to one or more of the features described above, or as an alternative, further embodiments may include disposing the refrigerated shipping containers at a top position of a stacked formation.

Further disclosed is a computer program product stored on a computer readable storage medium for determining a stacked formation of refrigerated shipping containers. The computer program product includes a medium for receiving an input regarding a container temperature of a plurality of refrigerated shipping containers. The medium compares the input to stored parameters to categorize the plurality of refrigerated shipping containers in a temperature container category or a second temperature container category, each of the refrigerated shipping containers having a condenser. The medium outputs a recommended stacked formation of the refrigerated shipping containers based on the temperature categorization of the refrigerated shipping containers.

In addition to one or more of the features described above, or as an alternative, further embodiments may include that the first temperature container category is a low temperature container category.

In addition to one or more of the features described above, or as an alternative, further embodiments may include that the second temperature container category is a high temperature container category.

BRIEF DESCRIPTION OF THE DRAWINGS

The following descriptions should not be considered limiting in any way. With reference to the accompanying drawings, like elements are numbered alike:

FIG. 4 is a schematic representation of an end view of a stacked formation having a single refrigerated container;

FIG. 5 is a schematic representation of an end view of a stacked formation having refrigerated containers to be maintained at different temperatures;

FIG. 6 is a schematic representation of an end view of a stacked formation having refrigerated containers maintained at different temperatures or with continuous operation and located in an environment with a known dominant wind direction;

FIG. 7 is a schematic representation of an end view of a stacked formation having refrigerated containers maintained at different temperatures or with continuous operation and located in an environment without a known dominant wind direction;

FIG. 8 is a schematic representation of a top view of a stacked formation having refrigerated containers maintained at similar temperatures; and FIG. 9 is a schematic representation of a top view of a stacked formation having refrigerated containers maintained at different temperatures or with continuous operation.

DETAILED DESCRIPTION

A detailed description of one or more embodiments of the disclosed apparatus and method are presented herein by way of exemplification and not limitation with reference to the Figures.

Figure 1:
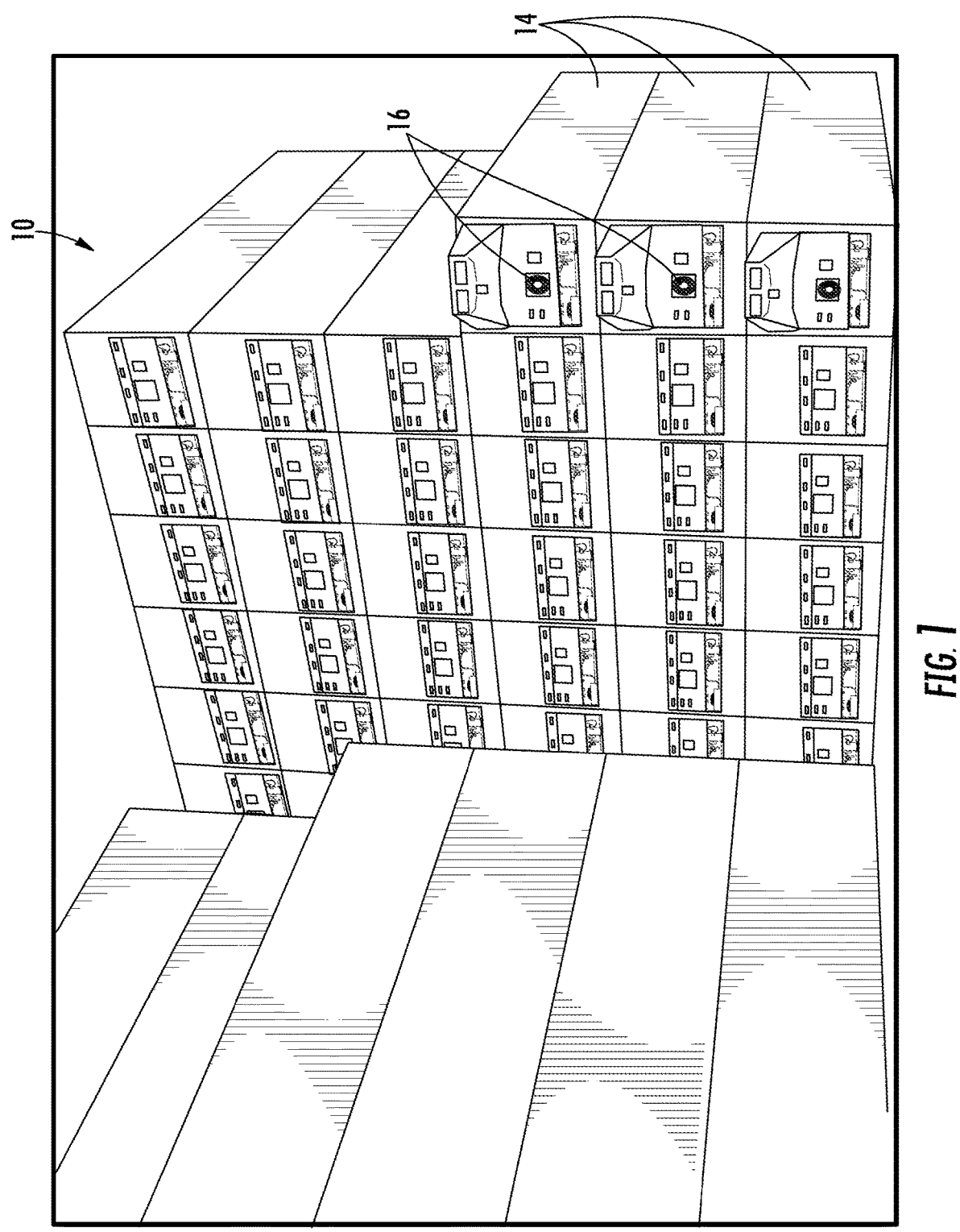
FIG. 1 is a perspective view of a plurality of shipping containers disposed in stacked formations.

Referring to FIG. 1, a stacked formation of a plurality of shipping containers 10 is illustrated. The shipping containers 10 are utilized to store and transport various types of cargo. The shipping containers 10 may be positioned in a stacked formation in a shipping yard or on a shipping vessel. Based on the cargo contained within some of the shipping containers 10, some of the containers are refrigerated shipping containers 14, also referred to herein as "reefers." Each of the reefers 14 includes a condenser 16 (FIG. 1A) that is attached at an end thereto.

Figure 1A:
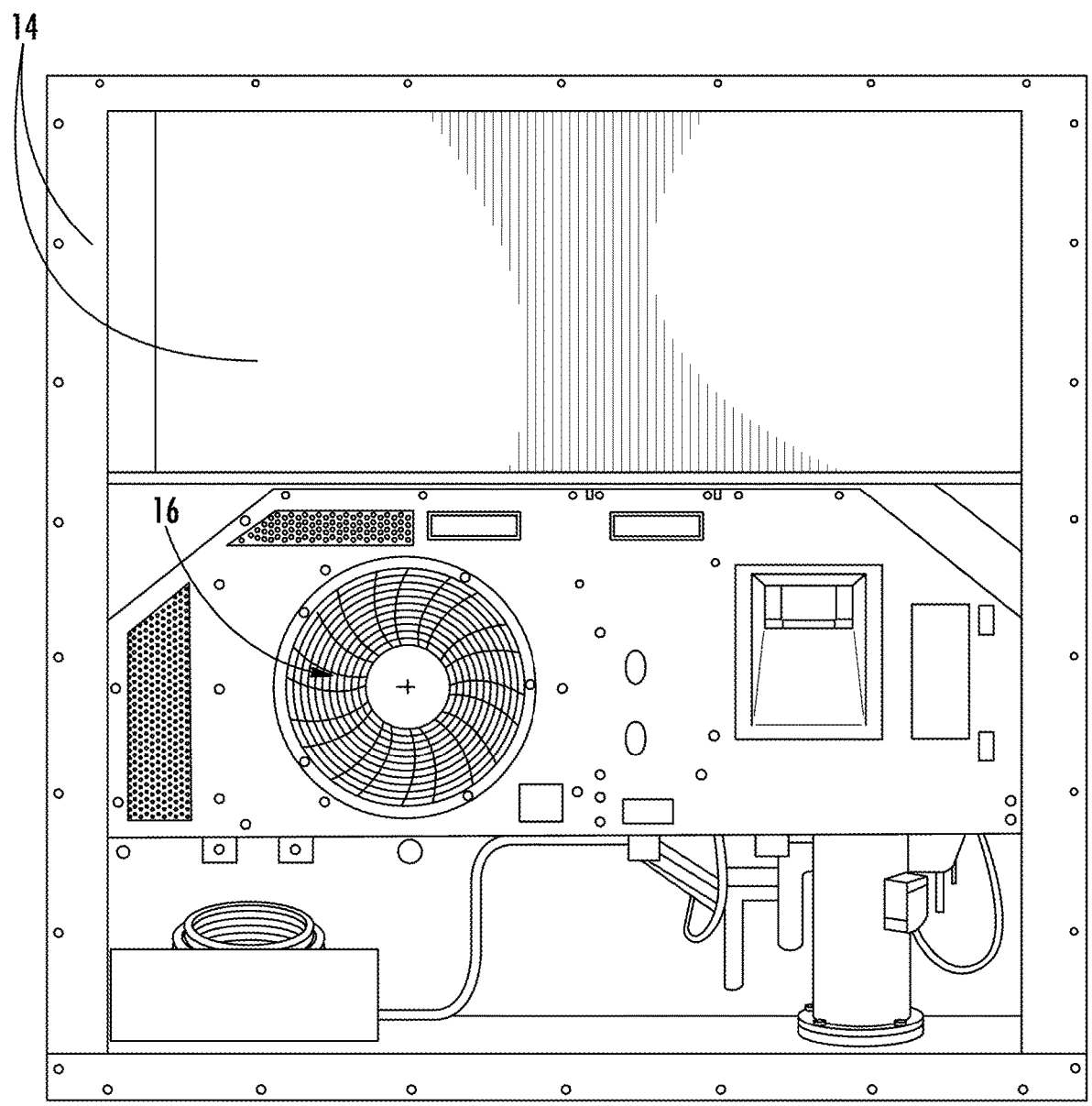
FIG. 1A is an end view of a condenser of one of the stacked shipping containers.
Figure 2:
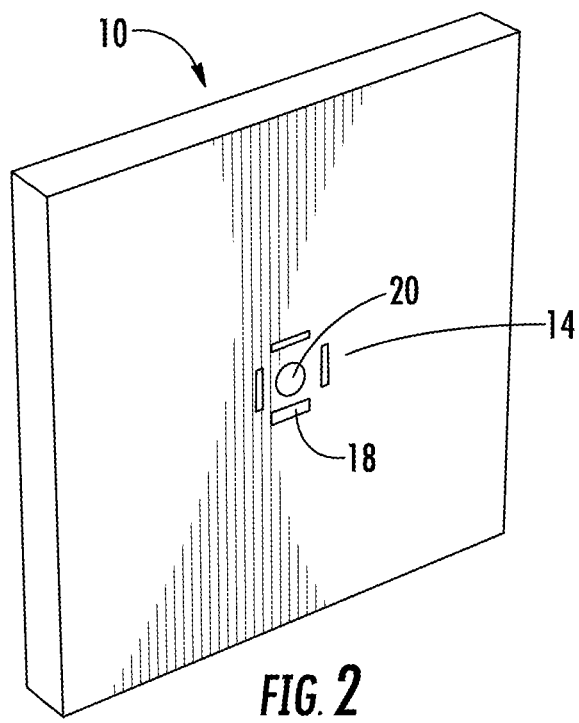
FIG. 2 is a schematic representation of stacked shipping containers.
Figure 3:
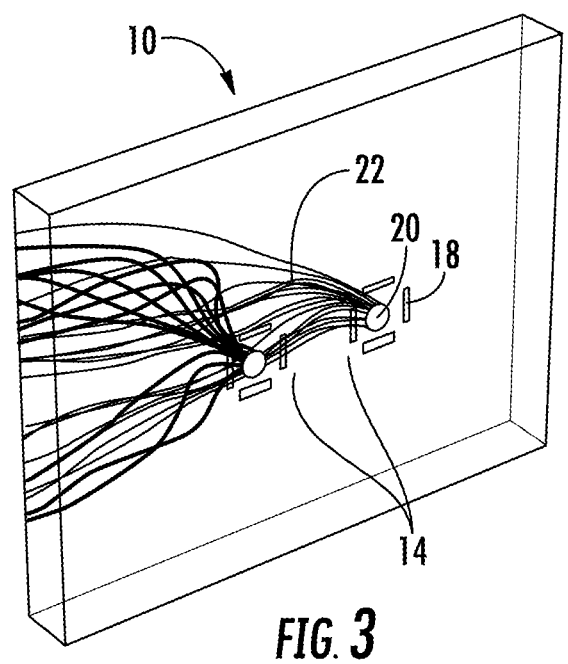
FIG. 3 is a schematic representation of stacked shipping containers with an airflow velocity profile illustrated.

Referring to FIGS. 2 and 3, with continued reference to FIG. 1A, the plurality of shipping containers 10 are schematically represented with matrices. FIG. 2 depicts a single reefer 14 that is represented with the condenser 16 disposed at an end thereof. The reefer 14 includes condenser air inlet apertures 18 that receive ambient air from a surrounding atmosphere. The reefer 14 also includes a condenser air outlet 20 that exhausts air that has been heated as a result of cooling the condenser 16. In other words, the condensers 16 use ambient air for cooling and discharge the heated air back to the surrounding atmosphere.

FIG. 3 includes a pair of adjacently disposed reefers 14 within the representation of the stacked formation of shipping containers 10. An airflow velocity profile 22 is shown to demonstrate how a flow path of heated exhaust air discharged from one condenser air outlet 20 may impact another condenser 16, as the adjacent condenser relies upon the ambient air, including the heated exhaust air, for cooling operation. Various factors dictate the impact of heated exhaust air discharged from one condenser. For example, a wind direction of the surrounding environment, the physical tendency of heated air to rise, and proximity of the condensers are illustrative factors that influence the impact of one condenser on another.

By way of analysis, it has been determined that condenser air recirculated from a high temperature reefer to a low temperature reefer (relative to the high temperature reefer) results in a larger temperature rise in the low temperature reefer condenser compared to recirculation of condenser air from a low temperature reefer to a high temperature reefer. Large enough temperature rises may undesirably lead to a unit shutdown. Additionally, condenser air recirculated from a high temperature reefer to a low temperature reefer (relative to the high temperature reefer) results in a higher power demand and a loss of capacity compared to recirculation of condenser air from a low temperature reefer to a high temperature reefer.

Based on the general knowledge that heated condenser discharge air impacts operation of other reefer condensers, as well as the specific analytical findings discussed above, various container stacking guidelines based on locations of the condensers 16 are disclosed herein. The guidelines improve energy efficiency and operation by adaptively stacking reefers according to space available, temperature control set points or cargo types, and weather conditions, for example. The guidelines disclosed herein may be used in combination or a single guideline may be utilized depending upon the factors under consideration.

Referring to FIGS. 4-9, various stacked formations of the plurality of shipping containers 10, including reefers 14, are illustrated to represent stacked formations adhering to the guidelines associated with a method of stacking the shipping containers. The boxes shown without a letter designation are unrefrigerated containers or empty spots of a stacked formation. Boxes designated with the letter L are low temperature reefers. Boxes designated with the letter H are high temperature reefers. Boxes designated with the letter V are reefers with ventilation and/or air modification and are continuously operated. Boxes designated with the letter X depict any type of reefer (i.e., L-type, H-type or V-type).

The method of stacking refrigerated shipping containers includes guidelines associated with their respective proximity to each other and/or their set point temperatures. In particular, the method includes determining a flow profile of heated air exhausted from condensers of the refrigerated shipping containers and disposing the refrigerated shipping containers relative to each other based on the locations of the condensers. Regarding the temperature-based aspect of the disclosure, the method includes categorizing the refrigerated shipping containers as a low temperature container or a high temperature container and disposing the refrigerated shipping containers relative to each other based on the temperature categorization of the refrigerated shipping containers.

As described above, reefers may also be categorized as continuously-operated reefers.

Referring to FIG. 8, the method includes avoiding lengthwise adjacency to minimize condenser airflow to other reefers. In other words, cross-aisle adjacency that includes disposing reefers in adjacent rows is to be avoided. If possible, a dry container row or an empty row is to be present between each of two reefer rows, as shown in FIG. 8. If other constraints dictate that such adjacency cannot be avoided, misaligned patterns of reefers are utilized to prevent direct blow of condenser exhaust air onto reefers across the aisle, as shown in FIG. 9.

FIGS. 8 and 9 are top views of multiple rows of shipping containers. The reefers are to be disposed on top tiers of stacked formations and at the end of rows of each bay with condensers facing open air, if possible. Additionally, the width-wise and height-wise distances between adjacent reefers are to be maximized. These proximity-based guidelines provide desirable mitigation of the impact of heated exhaust air on other reefers.

Referring to FIGS. 4-7, end views of stacked formations of the shipping containers are provided. Low temperature reefers are to be disposed upstream of high temperature reefers and reefers requiring continuous operation are disposed downstream of all cycling reefers, regardless of whether the cycling reefers are categorized as high temperature or low temperature. The downstream and upstream disposition of the reefers relates to a dominant wind direction, if known, and the natural tendency of heated air to rise. Based on these considerations, if no dominant wind direction is known, or if one is not present, all low temperature reefers in a stacked formation are located below the high temperature refers and the high temperature reefers are located below the continuous operation reefers, as shown in FIGS. 5 and 7. The aforementioned rules for stacking of cycling reefers based on temperature and wind direction also apply to reefers requiring continuous operation, but with different temperature set points.

If a dominant wind direction is known, the high temperature reefers are disposed down wind of the low temperature reefers and the continuous operation reefers are disposed down wind of the high temperature reefers, as shown in FIG. 6. A dominant wind direction refers to a detected or forecasted wind vector that exceeds a predetermined threshold that is sufficient to dominate the natural tendency of the heated exhaust air to rise.

A system in the form of a computer program product is provided. The system is connected to client systems via a communications network. The client systems are accessible by users. The server system and each of the client systems may be any suitable computer or other data processing system, e.g. a PC, a workstation, a server computer, etc. It will be appreciated that some or all of the client systems may be portable computers, such as laptop computers, PDAs, and/or the like. It will further be appreciated that the server system may be integrated with one of the client systems.

The communications network may include any network or combination of networks suitable for data communications, e.g. a computer network, such as a wide area network, an internet, a virtual private network, or the like. Further examples of communications networks include telecommunications networks, such as wireless telecommunications networks.

In one embodiment, the system is configured to perform the method of stacking shipping containers that is described in detail above. For example, the computer program product is stored on a computer readable storage medium for determining a stacked formation of refrigerated shipping containers. The medium receives inputs regarding the cargo temperature set-points of the refrigerated shipping containers and compares the inputs to stored parameters to categorize the refrigerated shipping containers as a low temperature container or a high temperature container. The medium outputs a recommended stacked formation of the refrigerated shipping containers based on the temperature categorization of the refrigerated shipping containers based on the guidelines discussed above, and which are programmed therein.

Advantageously, the guidelines associated with the method of stacking the shipping containers based on the locations of the condensers, as well as the computer program product, described herein reduce or eliminate the impact of condenser air recirculation on energy and operation by appropriate reefer stacking. Simulations and analysis showed that appropriate allocation of reefers with different set points or cargo type would reduce power consumption of the refrigeration system by 10%-15%, or more. System trip-offs due to rising condensing temperature with recirculated air will also be reduced or avoided.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of stacking refrigerated shipping containers comprising:
    categorizing a plurality of refrigerated shipping containers as a low temperature container or a high temperature container, wherein a high temperature container is maintained at a temperature greater than a maintained temperature of a low temperature container, each of the refrigerated shipping containers having a condenser;
    determining a dominant wind direction of ambient air surrounding the refrigerated shipping containers; and
    physically disposing the plurality of refrigerated shipping containers relative to each other based on the temperature categorization of the refrigerated shipping containers such that there is recirculation of condenser air from the low temperature container to the high temperature container.

2. The method of claim 1, wherein the refrigerated shipping containers categorized as high temperature containers are disposed on top of the refrigerated shipping containers categorized as low temperature containers if no dominant wind direction is determined.

3. The method of claim 1, wherein the refrigerated shipping containers categorized as high temperature containers are disposed on top of the refrigerated shipping containers categorized as low temperature containers if no dominant wind direction is known.

4. The method of claim 1, further comprising disposing at least one refrigerated shipping container that operates under continuous refrigeration on top of the refrigerated shipping containers categorized as high temperature containers if no dominant wind direction is determined or if no dominant wind direction is known.

5. The method of claim 1, wherein the refrigerated shipping containers categorized as high temperature containers are disposed downwind of the refrigerated shipping containers categorized as low temperature containers based on the dominant wind direction determined.

6. The method of claim 5, further comprising disposing at least one refrigerated shipping container that operates under continuous refrigeration down wind of the refrigerated shipping containers categorized as high temperature containers based on the dominant wind direction determined.

7. A method of stacking refrigerated shipping containers comprising:
   determining a flow profile of heated air exhausted from a plurality of condensers of a plurality of refrigerated shipping containers; and
   disposing the plurality of refrigerated shipping containers relative to each other based on the locations of the plurality of condensers such that there is recirculation of condenser air from a low temperature container to a high temperature container, wherein the high temperature container is maintained at a temperature greater than a maintained temperature of the low temperature container.

8. The method of claim 7, wherein disposing the refrigerated shipping containers comprises avoiding disposing two condensers in adjacent rows.

9. The method of claim 7, wherein disposing the refrigerated shipping containers comprises disposing two condensers in adjacent rows and at different stacked heights.

10. The method of claim 7, wherein disposing the refrigerated shipping containers comprises maximizing the spacing between the condensers in a width-wise direction.

11. The method of claim 7, wherein disposing the refrigerated shipping containers comprises maximizing the spacing between the condensers in a height-wise direction.

12. The method of claim 7, further comprising disposing the refrigerated shipping containers at a top position of a stacked formation.

13. The method of claim 7, further comprising disposing the refrigerated shipping containers in end rows of a stacked formation.

14. The method of claim 13, wherein the condensers are facing open air.

15. A computer program product stored on a computer readable storage medium for determining a stacked formation of refrigerated shipping containers comprising:
   a medium for receiving an input regarding a container temperature of a plurality of refrigerated shipping containers;
   the medium comparing the input to stored parameters to categorize the plurality of refrigerated shipping containers in a first temperature container category or a second temperature container category, each of the refrigerated shipping containers having a condenser; and
   the medium outputting a recommended stacked formation of the refrigerated shipping containers based on the temperature categorization of the refrigerated shipping containers;
   wherein the first temperature container category is a low temperature container category, wherein the second temperature container category is a high temperature container category, wherein the high temperature container is maintained at a temperature greater than a maintained temperature of the low temperature container;
   wherein the recommended stacked formation is selected such that there is recirculation of condenser air from a low temperature container to a high temperature container.

* * * * *